No. 887,810. PATENTED MAY 19, 1908.
L. L. JACKSON.
COMBINED DISK HARROW AND LAND ROLLER.
APPLICATION FILED SEPT. 12, 1907.
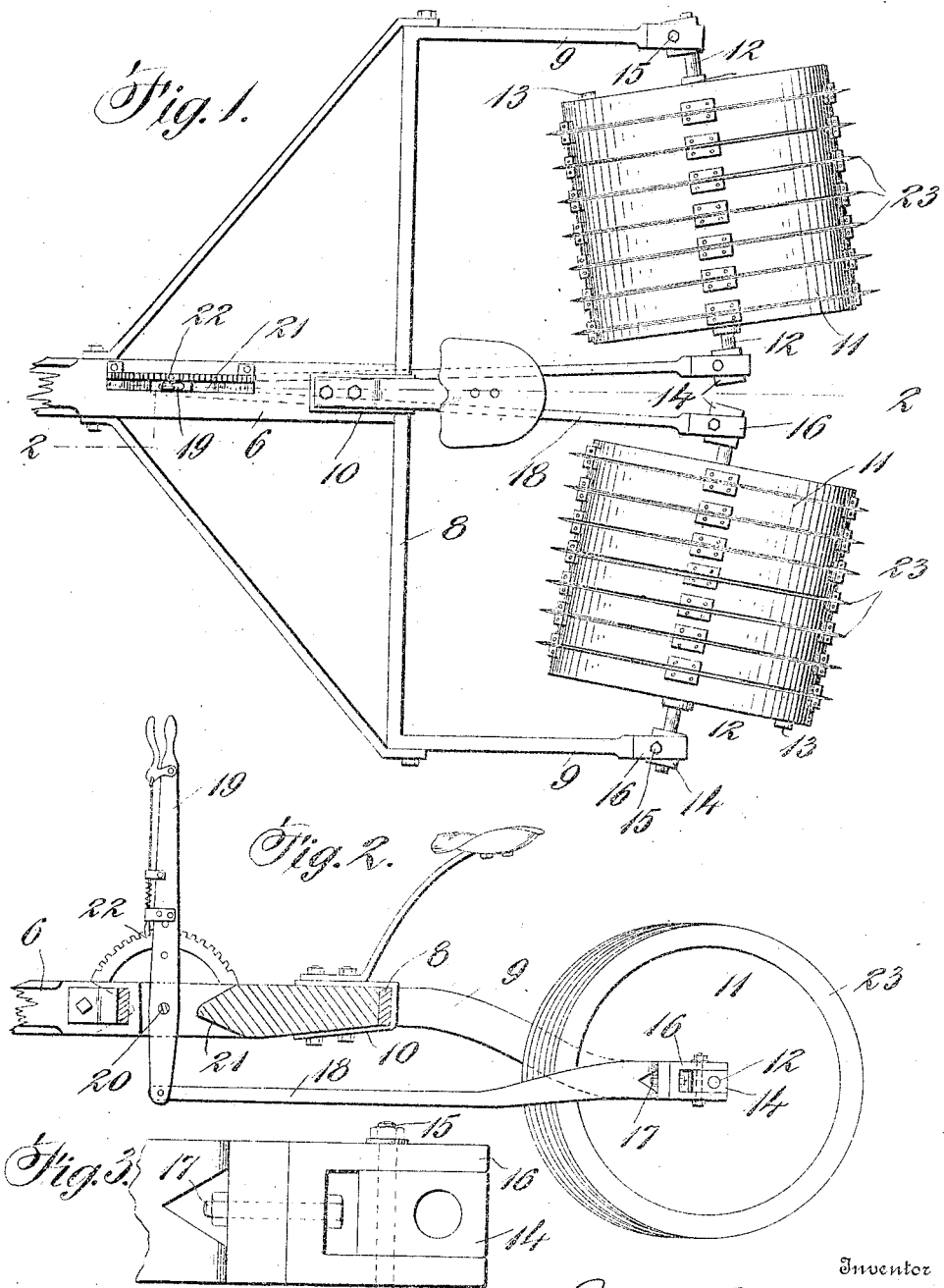

UNITED STATES PATENT OFFICE.

LEWIS LIVINGSTON JACKSON, OF ROCKWALL, TEXAS.

COMBINED DISK HARROW AND LAND-ROLLER.

No. 887,810.   Specification of Letters Patent.   Patented May 19, 1908.

Application filed September 12, 1907. Serial No 392,505.

*To all whom it may concern:*

Be it known that I, LEWIS L. JACKSON, a citizen of the United States, residing at Rockwall, in the county of Rockwall and State of Texas, have invented certain new and useful Improvements in a Combined Disk Harrow and Land-Roller, of which the following is a specification.

This invention is a combined disk harrow and land roller and has for its object to provide an improved device which may be used for the purpose of a harrow or a roller.

A further object of the invention is to provide improved means for varying the angle of the rollers or disks with respect to the line of draft, whereby the depth and the nature of the cut are varied.

A further object of the invention is to provide an implement having improved details of construction as will more fully appear hereinafter.

The device is illustrated in the accompanying drawings, in which,

Figure 1 is a top plan view of the harrow.
Fig. 2 is a vertical section on the line 2—2 of Fig. 1. Fig. 3 is an enlarged detail in side elevation showing a swiveling bearing box for the axle of the roller.

Referring specifically to the drawings, 6 indicates the tongue of the implement, to which the draft animals are hitched, and this tongue carries at its rear end a seat for the operator. The roller frame consists of a cross bar 8 having rearwardly extending arms 9 at the ends, and this bar is fixed at the middle to the end of the tongue by means of a strap or clip 10 which is conveniently fastened by the same bolts as the seat.

The implement includes or contains two rollers. Each consists of a water tight metal cylinder 11 having journals 12 at the ends. These cylinders are hollow and may be more or less filled with water through holes in the ends closed by plugs 13.

The journal at one end of each cylinder finds bearings in a box 14 at the end of the arm 9. This box is arranged to swivel, being connected by a vertical bolt 15 to a U-shaped bracket or coupling 16 which is fixed to the rear end of the arm 9 by a bolt 17 on which the bracket or coupling can swivel in a vertical plane, according to variations in the vertical plane of the journal incident to passing over rough or uneven ground. The bearing is held between the branches of the bracket and is free to turn to the desired extent in a horizontal plane. The journal at the other bearing box 14 similarly fastened to the end of a bar 18 which is connected to the lower end of a lever 19 which is fulcrumed on a bolt 20 and extends through a slot 21 in the tongue, in position in front of the seat. The lever is provided with the usual latch and segment 22 to hold the same at adjustment. The respective bars 18 are connected to opposite sides of the lever at the lower end thereof and extend thence rearwardly to connection with the journals of the respective rollers.

Each roller or cylinder is provided with a plurality of removable annular cutting disks or blades 23 extending circumferentially around the cylinder, and located a proper distance apart, say six inches.

In the use of the device as a harrow, the cutting disks are applied to the cylinders. By means of the lever 19 the angle of the axes of the cylinders may be adjusted as desired, to give a cut parallel to the line of draft or at a greater or less angle thereto. For use as a land roller the disks are removed.

The weight of the cylinders may also be varied as desired, by placing more or less water therein, and when heavily weighted the device is useful as a roller for roads, streets and the like.

I claim:

1. The combination of a frame having bearing boxes at opposite sides thereof, rods movable lengthwise of the frame at the middle thereof and each having a bearing box at its rear end said bearing boxes being pivoted to swivel in vertical and horizontal planes, and rollers located side by side in the frame and having journals in the boxes.

2. The combination of a frame having rearwardly extending arms at opposite sides, a lever fulcrumed at the front of the frame, a pair of rearwardly extending rods connected to the lever, brackets connected by horizontal pivot bolts to the ends of the arms and the rods, bearing boxes mounted on vertical pivots in the brackets, and a pair of rollers having journals in said boxes.

In testimony whereof I affix my signature, in presence of two witnesses.

LEWIS LIVINGSTON JACKSON.

Witnesses:
A. H. MOUNT,
E. S. CANNON.